US012430608B2

(12) United States Patent
Balusu et al.

(10) Patent No.: US 12,430,608 B2
(45) Date of Patent: Sep. 30, 2025

(54) CLUSTERING OF ITEMS WITH HETEROGENEOUS DATA POINTS

(71) Applicant: Walmart Apollo, LLC, Bentonville, AR (US)

(72) Inventors: Raghava Balusu, Achanta (IN);
Avinash M. Jade, Bangalore (IN);
Lingfeng Zhang, Dallas, TX (US);
Srinivas Muktevi, Bengaluru (IN);
Amit Jhunjhunwala, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 295 days.

(21) Appl. No.: 17/963,903

(22) Filed: Oct. 11, 2022

(65) Prior Publication Data

US 2024/0119409 A1   Apr. 11, 2024

(51) Int. Cl.
*G06Q 10/08* (2024.01)
*G06F 16/55* (2019.01)
*G06Q 10/087* (2023.01)

(52) U.S. Cl.
CPC .......... *G06Q 10/087* (2013.01); *G06F 16/55* (2019.01)

(58) Field of Classification Search
CPC .. G06Q 10/087; G06Q 10/08; G06Q 30/0639; G06Q 20/203; G06Q 30/0643; G06Q 20/208; G06V 20/52; G06V 10/82; G06N 20/00; G06N 5/04; G06N 3/02; G06N 3/08; G06T 7/73;
(Continued)

(56) References Cited

U.S. PATENT DOCUMENTS 5,074,594 A   12/1991   Laganowski
6,570,492 B1   5/2003   Peratoner
(Continued)

FOREIGN PATENT DOCUMENTS

CN   106347550 B   8/2019
CN   110348439 B   10/2019
(Continued)

OTHER PUBLICATIONS

U.S. Appl. No. 17/963,787, filed Oct. 11, 2022, Lingfeng Zhang.
(Continued)

*Primary Examiner* — Florian M Zeender
*Assistant Examiner* — Milena Racic
(74) *Attorney, Agent, or Firm* — Foley IP Law, PLLC

(57) ABSTRACT

In some embodiments, apparatuses and methods are provided herein useful to updating inventory of products. In some embodiments, there is provided a system for updating inventory of products including a database; at least one image capture device; and a control circuit. The control circuit is configured to: process an image by: detecting units of one or more products in the image; grouping each detected unit into one or more clusters based on at least one of textual similarities, visual similarities, geometrical similarities, or relative spatial distance; detecting a product identifier for each cluster; identifying a product corresponding to the detected product identifier of each cluster; and counting the detected units associated with each cluster. The control circuit is configured to cause an update to the inventory of products in the database based on the counted detected units of each cluster.

18 Claims, 11 Drawing Sheets

(58) Field of Classification Search
CPC . G06T 2207/20084; G06T 7/00; G06F 16/55; A47L 11/4011; G05B 19/418
See application file for complete search history.

(56) References Cited

U.S. PATENT DOCUMENTS

| | | | |
|---|---|---|---|
| 8,923,650 | B2 | 12/2014 | Wexler |
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 9,996,818 | B1* | 6/2018 | Ren .................. G06F 16/5866 |
| 10,002,344 | B2 | 6/2018 | Wu |
| 10,019,803 | B2 | 7/2018 | Venable |
| 10,032,072 | B1 | 7/2018 | Tran |
| 10,129,524 | B2 | 11/2018 | Ng |
| 10,210,432 | B2 | 2/2019 | Pisoni |
| 10,373,116 | B2 | 8/2019 | Medina |
| 10,562,707 | B1* | 2/2020 | Wise .................. B65G 1/065 |
| 10,572,757 | B2 | 2/2020 | Graham |
| 10,592,854 | B2 | 3/2020 | Schwartz |
| 10,642,277 | B2* | 5/2020 | Diehr .................. B08B 1/20 |
| 10,839,452 | B1 | 11/2020 | Guo |
| 10,882,692 | B1* | 1/2021 | Misra .................. G06Q 10/087 |
| 10,922,574 | B1 | 2/2021 | Tariq |
| 10,943,278 | B2 | 3/2021 | Benkreira |
| 10,956,711 | B2 | 3/2021 | Adato |
| 10,984,374 | B2* | 4/2021 | Pike .................. G06K 7/10722 |
| 10,990,950 | B2 | 4/2021 | Garner |
| 10,991,036 | B1 | 4/2021 | Bergstrom |
| 10,994,933 | B2* | 5/2021 | Johnson .................. B65G 1/1373 |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 | 4/2022 | Schoner |
| 11,308,775 | B1 | 4/2022 | Sinha |
| 11,315,073 | B1* | 4/2022 | Famularo .................. G06V 10/751 |
| 11,409,977 | B1 | 8/2022 | Glaser |
| 11,427,404 | B2* | 8/2022 | Cairl .................. B65G 1/065 |
| 11,479,414 | B2* | 10/2022 | Johnson .................. G06Q 10/047 |
| 12,319,894 | B2* | 6/2025 | Farmer .................. C11D 3/06 |
| 2005/0238465 | A1 | 10/2005 | Razumov |
| 2011/0040427 | A1 | 2/2011 | Ben-Tzvi |
| 2014/0002239 | A1 | 1/2014 | Rayner |
| 2014/0247116 | A1 | 9/2014 | Davidson |
| 2014/0307938 | A1 | 10/2014 | Doi |
| 2015/0363660 | A1 | 12/2015 | Vidal |
| 2016/0203525 | A1 | 7/2016 | Hara |
| 2017/0106738 | A1 | 4/2017 | Gillett |
| 2017/0286773 | A1 | 10/2017 | Skaff |
| 2018/0005176 | A1 | 1/2018 | Williams |
| 2018/0018788 | A1 | 1/2018 | Olmstead |
| 2018/0029797 | A1* | 2/2018 | Hance .................. B65G 1/0492 |
| 2018/0043533 | A1* | 2/2018 | Johnson .................. G06Q 10/047 |
| 2018/0197223 | A1 | 7/2018 | Grossman |
| 2018/0260772 | A1 | 9/2018 | Chaubard |
| 2018/0284792 | A1* | 10/2018 | Kleiner .................. G05D 1/225 |
| 2018/0344116 | A1* | 12/2018 | Schriesheim .................. G05D 1/0016 |
| 2019/0025849 | A1 | 1/2019 | Dean |
| 2019/0043003 | A1 | 2/2019 | Fisher |
| 2019/0050932 | A1 | 2/2019 | Dey |
| 2019/0087772 | A1 | 3/2019 | Medina |
| 2019/0163698 | A1 | 5/2019 | Kwon |
| 2019/0197561 | A1 | 6/2019 | Adato |
| 2019/0220482 | A1 | 7/2019 | Crosby |
| 2019/0236531 | A1 | 8/2019 | Adato |
| 2020/0118063 | A1 | 4/2020 | Fu |
| 2020/0211217 | A1* | 7/2020 | Cairl .................. G01S 17/89 |
| 2020/0246977 | A1 | 8/2020 | Swietojanski |
| 2020/0265494 | A1 | 8/2020 | Glaser |
| 2020/0278667 | A1* | 9/2020 | Voorhies .................. B25J 9/1697 |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0049541 | A1 | 2/2021 | Gong |
| 2021/0049542 | A1 | 2/2021 | Dalal |
| 2021/0096560 | A1* | 4/2021 | al-Mohssen .................. A47L 11/4066 |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0374836 | A1* | 12/2021 | Bronicki .................. G06Q 30/0201 |
| 2021/0400195 | A1 | 12/2021 | Adato |
| 2022/0043547 | A1 | 2/2022 | Jahjah |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0138914 | A1 | 5/2022 | Wang |
| 2022/0165074 | A1 | 5/2022 | Srivastava |
| 2022/0222924 | A1 | 7/2022 | Pan |
| 2022/0262008 | A1 | 8/2022 | Kidd |
| 2024/0029400 | A1* | 1/2024 | Elumalai .................. G06V 10/764 |
| 2025/0190900 | A1* | 6/2025 | Mande .................. G06Q 10/06312 |

FOREIGN PATENT DOCUMENTS

| | | | |
|---|---|---|---|
| CN | 110443298 | B | 2/2022 |
| CN | 114898358 | A | 8/2022 |
| EP | 3217324 | A1 | 9/2017 |
| EP | 3437031 | | 2/2019 |
| EP | 3479298 | | 5/2019 |
| JP | 6463804 | B2* | 2/2019 .......... G06Q 10/087 |
| WO | 2006113281 | A2 | 10/2006 |
| WO | 2017201490 | A1 | 11/2017 |
| WO | 2018093796 | | 5/2018 |
| WO | 2020051213 | A1 | 3/2020 |
| WO | 2021186176 | A1 | 9/2021 |
| WO | 2021247420 | A2 | 12/2021 |

OTHER PUBLICATIONS

U.S. Appl. No. 17/963,751, filed Oct. 11, 2022, Yilun Chen.
U.S. Appl. No. 17/963,802, filed Oct. 11, 2022, Lingfeng Zhang.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/161,788, filed Jan. 30, 2023, Raghava Balusu.
U.S. Appl. No. 18/106,269, filed Feb. 6, 2023, Zhaoliang Duan.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Singh, Ankit; "Image Recognition and Object Detection in Retail"; <https://blog.paralleldots.com/featured/image-recognition-and-object-detection-in-retail/>; Sep. 26, 2019; pp. 1-11.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.

(56) References Cited

OTHER PUBLICATIONS

Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 1-6.

Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-15.

Paolanti, Marine et al.; "Mobile robot for retail surveying and inventory using visual and textual analysis of monocular pictures based on deep learning"; European Conference on Mobile Robots; Sep. 2017, 6 pages.

Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; pp. 1-11 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-6.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal, et al.; "Object identification for inventory management using convolutional neural network"; IEEE Applied Imagery Pattern Recognition Workshop (AIPR); Oct. 2016, 6 pages.

Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

* cited by examiner

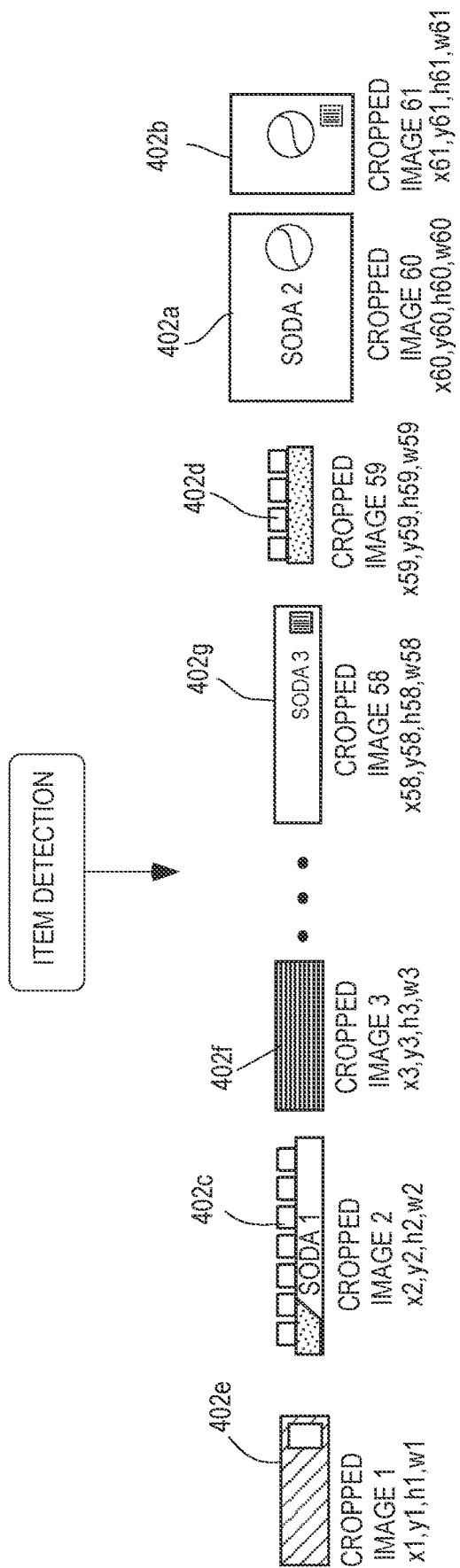

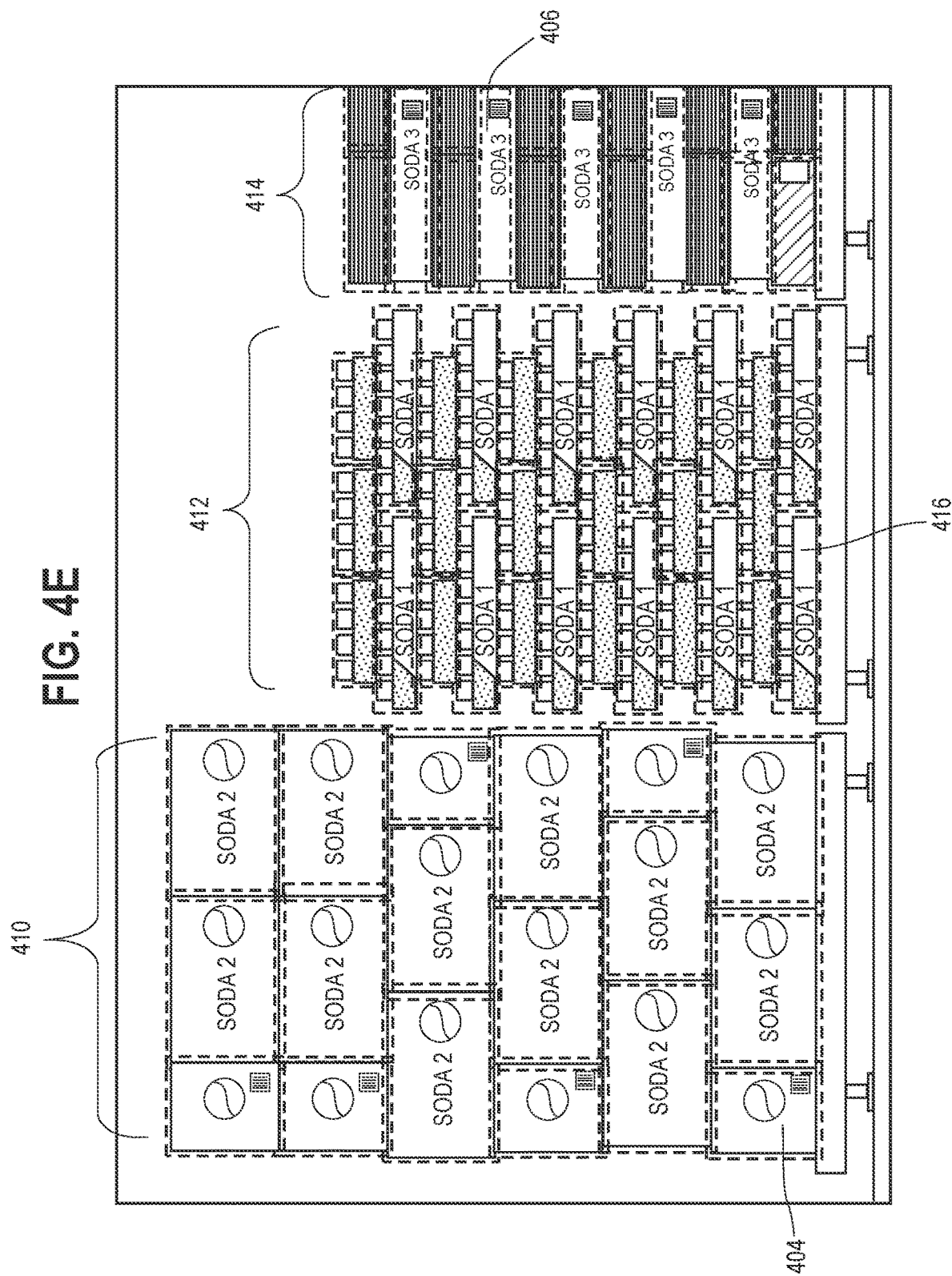

CLUSTERING OF ITEMS WITH HETEROGENEOUS DATA POINTS

TECHNICAL FIELD

This invention relates generally to updating inventory of products.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect or inventory product display shelves and/or pallet storage areas to determine which of the products are adequately stocked and which products are or will soon be out of stock and need to be replenished.

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems, apparatuses, and methods pertaining to updating inventory of products for sale and stored at a product storage facility. This description includes drawings, wherein:

FIGS. 4A-4G illustrate an exemplary processing of images in accordance with some embodiments.

Figure 1:
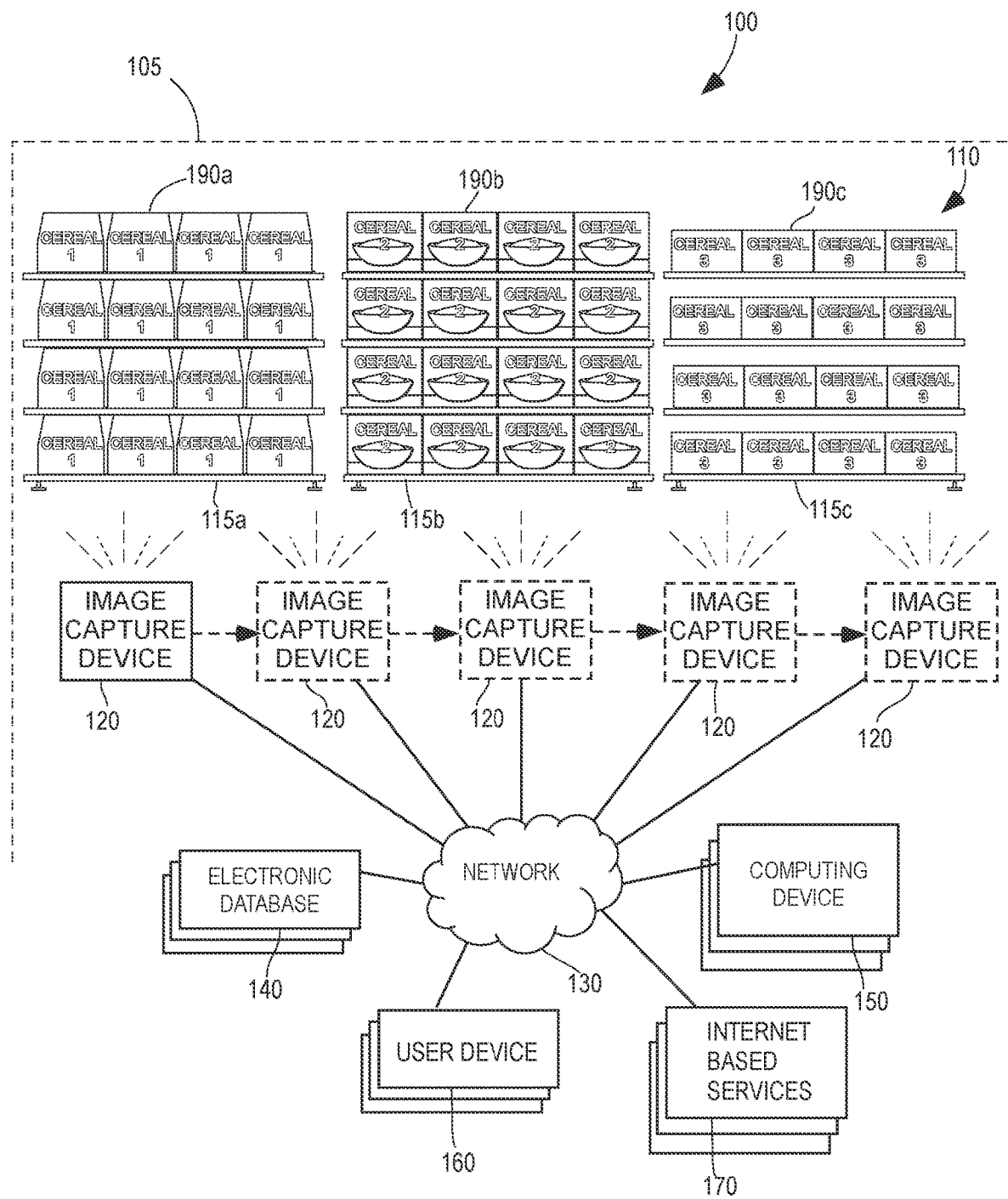
FIG. 1 is a diagram of an exemplary system of updating inventory of products at a product storage facility in accordance with some embodiments, depicting a front view of a product storage area storing groups of various individual products for sale and stored at a product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, apparatuses, and methods are provided herein useful for updating inventory of products for sale and stored at a facility. In some embodiments, a system for updating inventory of products includes a database, at least one image capture device, and a control circuit. The database may store data corresponding to the inventory of products. One or more image capture devices may capture one or more images of an area having one or more products at the facility. In some embodiments, the control circuit couples to at least one image capture device. The control circuit processes an image of the one or more images. In some embodiments, the processing of an image includes detecting units of the one or more products in the image, grouping each detected unit into one or more clusters based on at least one of textual similarities, visual similarities, geometrical similarities, or relative spatial distance; detecting a product identifier for each cluster of the one or more clusters; identifying a product corresponding to the detected product identifier of each cluster; and/or counting the detected units associated with each cluster. Alternatively, or in addition to, the control circuit may cause an update to the inventory of products in the database based on the counted detected units of each cluster.

In some embodiments, a method for updating inventory of products for sale and stored at a facility includes processing, by a control circuit, an image of one or more images of an area having one or more products at the facility. The one or more images are captured by at least one image capture device. The processing of the image includes detecting units of the one or more products in the image; grouping each detected unit into one or more clusters based on at least one of textual similarities, visual similarities, geometrical similarities, or relative spatial distance; detecting a product identifier for each cluster of the one or more clusters; identifying a product corresponding to the detected product identifier of each cluster; and/or counting the detected units associated with each cluster. Alternatively, or in addition to, the method may include causing, by the control circuit, an update to inventory of products stored in a database based on the counted detected units of each cluster.

FIG. 1 shows an embodiment of a system 100 of updating inventory of products for sale and stored at product storage areas 110 and/or on product storage structures 115 of a product storage facility 105 (which may be a retail store, a product distribution center, a fulfillment center, a warehouse, etc.). The system 100 is illustrated in FIG. 1 for simplicity with only one movable image capture device 120 that moves about one product storage area 110 containing three separate product storage structures 115*a*, 115*b*, and 115*c*, but it will be appreciated that, depending on the size of the product storage facility, the system 100 may include multiple movable image capture devices 120 located throughout the product storage facility that monitor hundreds of product storage areas 110 and thousands of product storage structures 115a-115c. It is understood that the movement about the product storage area 110 by the image capture device(s) 120 may depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190a-190c are stored, and may include a rack, a pallet, a shelf cabinet, a single shelf, a shelving unit, table, rack, displays, bins, gondola, case, countertop, or another product display. Likewise, it will be appreciated that the number of individual products 190a-190c representing three exemplary distinct products (labeled as "Cereal 1," "Cereal 2," and "Cereal 3") is chosen by way of example only. Further, the size and shape of the products 190a-190c in FIG. 1 have been shown by way of example only, and it will be appreciated that the individual products 190a-190c may have various sizes and shapes. Notably, the term products 190 may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured to move around the product storage facility (e.g., on the floor via a motorized or non-motorized wheel-based/track-based locomotion system, via slidable tracks above the floor, via a toothed metal wheel/linked metal tracks system, etc.) such that, when moving (e.g., about an aisle or other area of a product storage facility 105), the image capture device 120 has a field of view that includes at least a portion of one or more of the product storage structures 115a-115c within a given product storage area 110 of the product storage facility 105, permitting the image capture device 120 to capture multiple images of the product storage area 110 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet-based/cloud-based service module) is configured to process such images as will be described in more detail below.

The exemplary system 100 shown in FIG. 1 includes an electronic database 140. Generally, the exemplary electronic database 140 may be configured as a single database, or a collection of multiple communicatively connected databases (e.g., digital image database, meta data database, inventory database, pricing database, customer database, vendor database, manufacturer database, etc.) and is configured to store various raw and processed images of the product storage area 110 captured by the image capture device 120 while the image capture device 120 is moving around the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based. In some embodiments, the electronic database 140 may include one or more memory devices, computer data storage, and/or cloud-based data storage configured to store one or more of product inventories, pricing, and/or demand, and/or customer, vendor, and/or manufacturer data.

The system 100 of FIG. 1 further includes a computing device 150 configured to communicate with the electronic database 140, user devices 160, and/or internet-based services 170, and the image capture device 120 over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, portions of the network 130 are located at or in the product storage facility.

The computing device 150 may be a stationary or portable electronic device, for example, a server, a cloud-server, a series of communicatively connected servers, a computer cluster, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
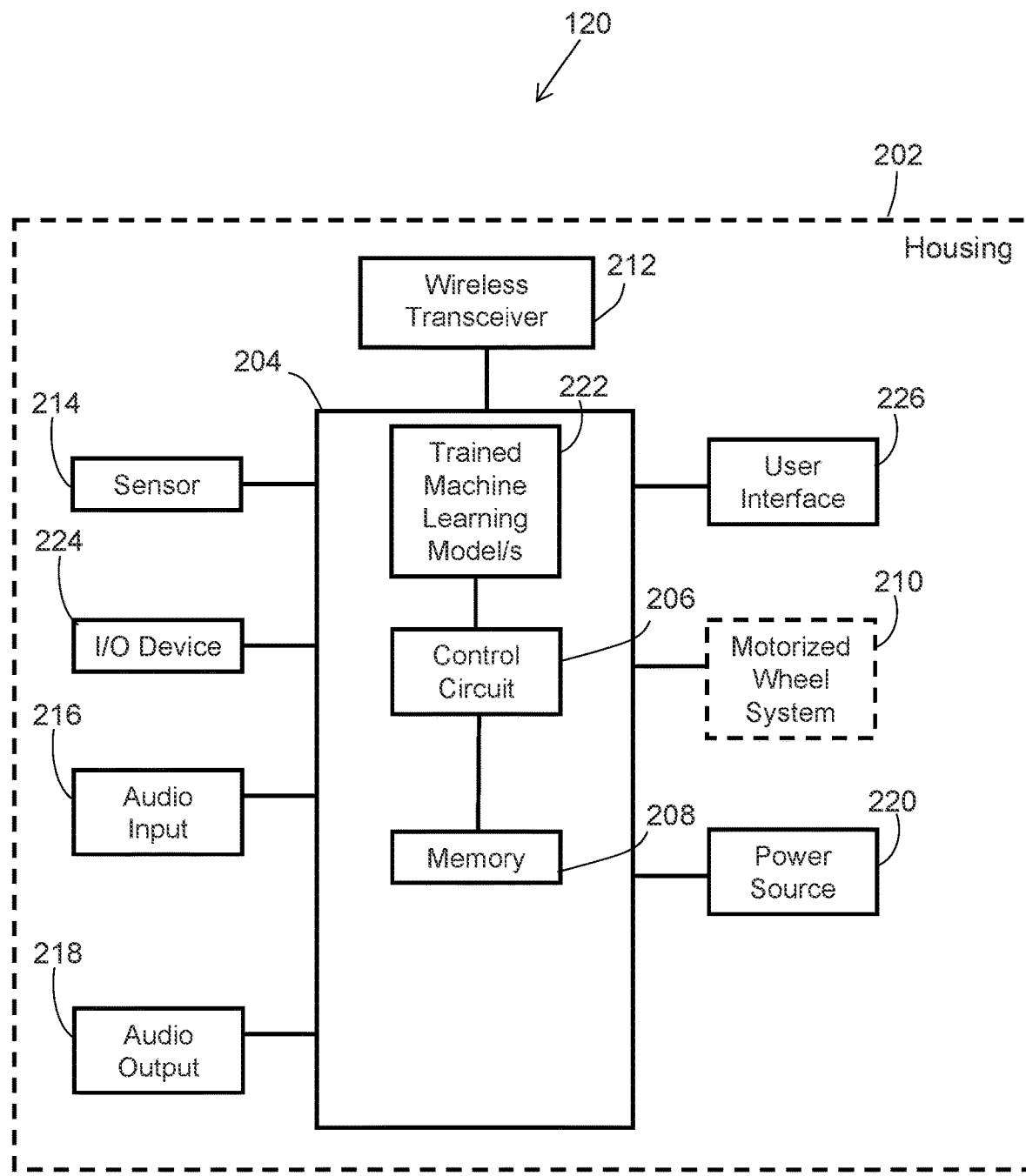
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move around the product storage facility 105, and may instead be moved (e.g., driven, pushed, carried, worn, etc.) by a human operator, or may be movably coupled to a track system (which may be above the floor level or at the floor level) that permits the image capture device 120 to move around the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates around a horizontal axis) under power to thereby cause the image capture device 120 to move through interaction with, e.g., the floor of the product storage facility. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility. So configured, the control circuit 206 of the image capture device 120 can provide information to the computing device 150 (via the network 130) and can receive information and/or movement instructions (instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility or other motorized image capture devices 120 moving around the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 224 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 224 may work together with or separate from any user interface implemented at an optional user interface unit or user device 160 (such as a smart phone or tablet device) usable by a worker at the product storage facility. In some embodiments, the user interface 224 is separate from the image capture device 202, e.g., in a separate housing or device wired or wirelessly coupled to the image capture device 202. In some embodiments, the user interface may be implemented in a mobile user device 160 carried by a person and configured for communication over the network 130 with the image capture device 102.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules 222 to perform at some of the functions. For example, the control circuit 206 may be trained to process one or more images of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, Gradient Boosting Algorithms, Convolutional Neural Network (CNN), Recurrent Neural Network (RNN), Deep Neural Network (DNN), and/or algorithms associated with neural networks. In some embodiments, the trained machine learning model 222 includes a computer program code stored in a memory 208 and/or executed by the control circuit 206 to process one or more images, as described in more detail below.

It is noted that not all components illustrated in FIG. 2 are included in all embodiments of the motorized image capture device 120. That is, some components may be optional depending on the implementation of the motorized image capture device 120.

Figure 3:
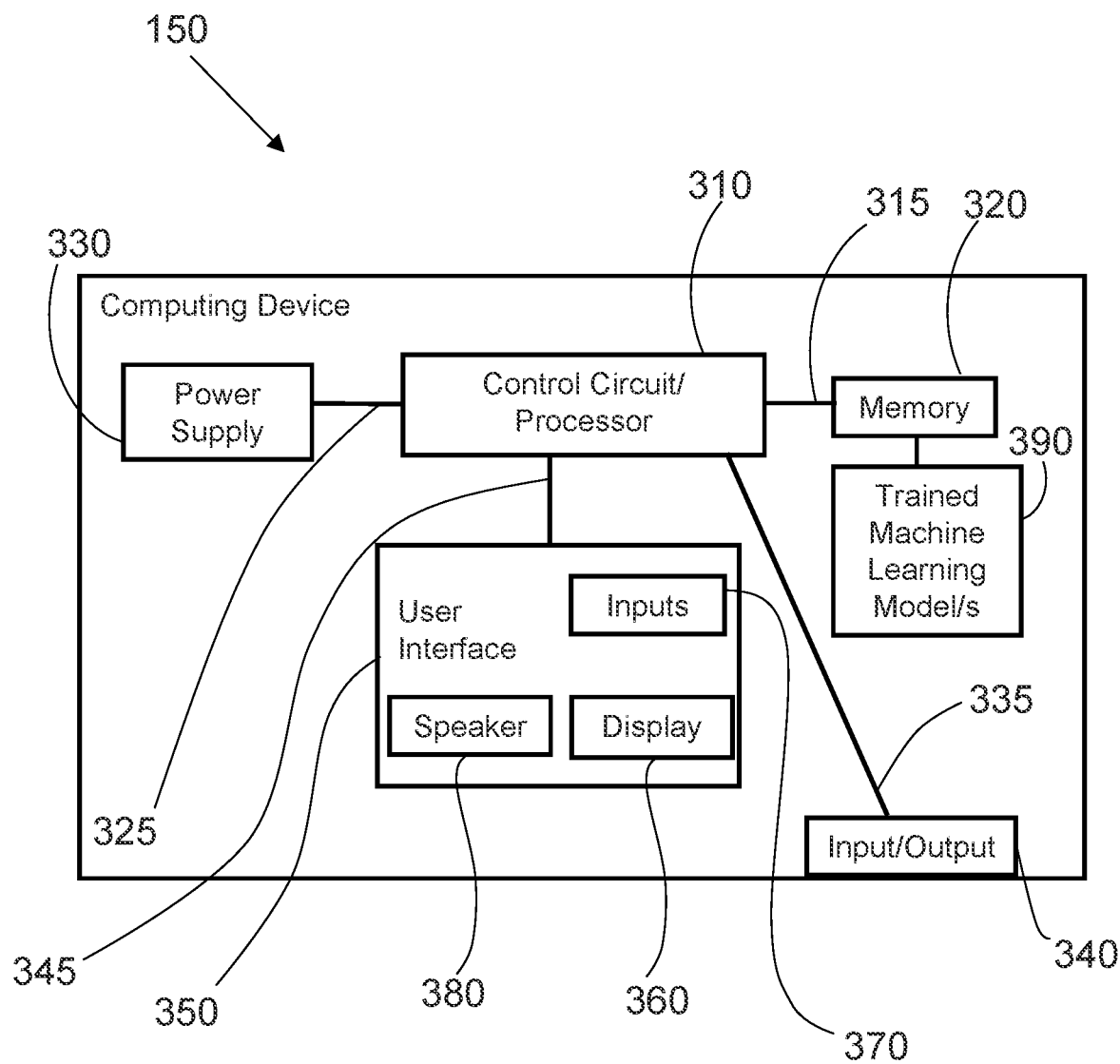
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, etc., the electronic database 140, internet-based services 170 (e.g., image processing services, computer vision services, neural network services, etc.), and/or from another electronic device (e.g., an electronic or user device of a worker tasked with physically inspecting the product storage area 110 and/or the product storage structures 115a-115c and observe the individual products 190a-190c stocked thereon. The input/output 340 of the computing device 150 can also send signals to other devices, for example, a signal to the electronic database 140 including an image of a given product storage structure 115*b* selected by the control circuit 310 of the computing device 150 as fully showing the product storage structure 115*b* and each of the products 190*b* stored on the product storage structure 115*b*. Also, a signal may be sent by the computing device 150 via the input-output 340 to the image capture device 120 to, for example, provide a route of movement for the image capture device 120 through the product storage facility.

The processor-based control circuit 310 of the computing device 150 shown in FIG. 3 may be electrically or wirelessly coupled via a connection 345 to a user interface 350, which may include a visual display or display screen 360 (e.g., LED screen) and/or button input 370 that provide the user interface 350 with the ability to permit a user (e.g., worker at a the product storage facility 105 or a worker at a remote regional center) to access the computing device 150 by inputting commands via touch-screen and/or button operation and/or voice commands. Possible commands may, for example, cause the computing device 150 to cause transmission of an alert signal to an electronic mobile user device 160 of a worker at the product storage facility 105 to assign a task to the worker that requires the worker to visually inspect and/or restock a given product storage structure 115*a*-115*c* based on analysis by the computing device 150 of the image of the product storage structure 115*a*-115*c* captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human user.

As pointed out above, in some embodiments, the image capture device 120 moves around the product storage facility 105 (while being controlled remotely by the computing device 150 (or another remote device such as the user device 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence) multiple images of the product storage area 110 from various angles. In some aspects, the control circuit 310 of the computing device 150 obtains (e.g., from the electronic database 140 or directly from the image capture device 120) the images of the product storage area 110 captured by the image capture device 120 while moving about the product storage area 110.

The sensor 214 (e.g., digital camera) of the image capture device 120 is located and/or oriented on the image capture device 120 such that, when the image capture device 120 moves about the product storage area 110, the field of view of the sensor 214 includes only portions of adjacent product storage structures 115*a*-115*c*, or an entire product storage structure 115*a*-115*c*. In certain aspects, the image capture device 120 is configured to move about the product storage area 110 while capturing images of the product storage structures 115*a*-115*c* at certain predetermined time intervals (e.g., every 1 second, 5 seconds, 10 seconds, etc.).

The images captured by the image capture device 120 may be transmitted to the electronic database 140 for storage and/or to the computing device 150 for processing by the control circuit 310 and/or to a web-/cloud-based image processing service 170. In some embodiments, one or more of the image capture devices 120 of the exemplary system 100 depicted in FIG. 1 is mounted on a motorized robotic unit similar to the motorized robotic image capture device 120 of FIG. 2.

In some embodiments, one or more of the image capture devices 120 of the exemplary system 100 depicted in FIG. 1 is configured to be stationary or mounted to a structure, such that the image capture device 120 may capture one or more images of an area having one or more products at the product storage facility. For example, the area may include a product storage area 110, and/or a portion of and/or an entire product storage structures 115*a*-115*c* of the product storage facility.

In some embodiments, the electronic database 140 stores data corresponding to the inventory of products in the product storage facility. The control circuit 310 processes the images captured by the image capture device 120 and causes an update to the inventory of products in the electronic database 140. In some embodiments, one or more steps in the processing of the images are via machine learning and/or computer vision models that may include one or more trained neural network models. In certain aspects, the neural network may be a deep convolutional neural network. The neural network may be trained using various data sets, including, but not limited to: raw image data extracted from the images captured by the image capture device 120; metadata extracted from the images captured by the image capture device 120; reference image data associated with reference images of various product storage structures 115*a*-115*c* at the product storage facility; reference images of various products 190*a*-190*c* stocked and/or sold at the product storage facility; and/or planogram data associated with the product storage facility.

Figure 4A:
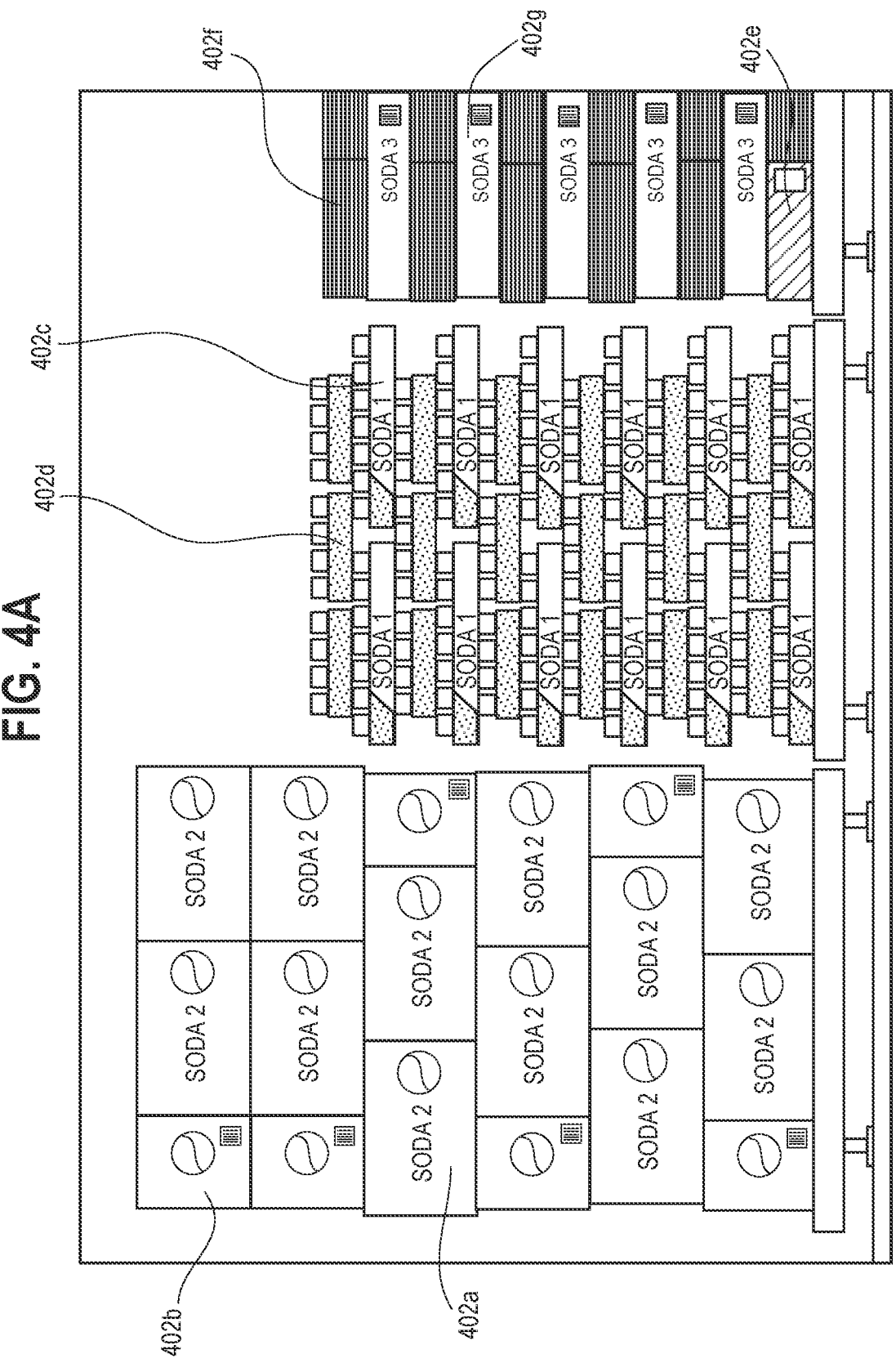

FIGS. 4A-4G and 5 illustrate an exemplary processing of images in accordance with some embodiments. In some embodiments, the control circuit 310, at step 504, detects units 402 of one or more products on an image. The control circuit 310 may use known edge detection techniques to detect each of units 402 in the image. In some embodiments, the control circuit 310 may use one or more known algorithms for object detection, such as Fast Region-Based Convolutional Network (Fast R-CNN), Faster R-CNN, Histogram of Oriented Gradients (HOG), Region-based Convolutional Neural Networks (R-CNN), Region-based Fully Convolutional Network (R-FCN), Single Shot Detector (SSD), Spatial Pyramid Pooling (SPP-net), and YOLO (You Only Look Once), to name a few, to detect each unit 402 in the image. The image shown in FIG. 4A depicts a number of units 402.

Alternatively, or in addition to, the control circuit 310 may group each detected unit 402 into one or more clusters based on at least one of textual similarities, visual similarities, geometrical similarities, or relative spatial distance. In some embodiments, the control circuit 310 via a trained machine learning model 390 may recognize textual similarities, visual similarities, geometrical similarities, and/or relative spatial distance of each unit 402 relative to one another. For example, the control circuit 310 associates a location value and/or proximity value (e.g., X, Y, H, W) to each detected unit as shown in FIG. 4B. In some embodiments, the control circuit 310 may perform feature vector embedding technique, such as using known Convolutional Neural Network to represent item image as numerical vector. In some embodiments, the control circuit 310 may perform Optical Character Recognition (OCR) technique to recognize texts within the detected item. In some embodiments, the control circuit 310 may be trained to recognize various visual, textual, and/or geometrical look and/or facings of each product using one or more machine learning algorithms, such as Linear Regression, Logistic Regression, Decision Tree, SVM, Naïve Bayes, kNN, K-Means, Random Forest, Dimensionality Reduction Algorithms, and Gradient Boosting Algorithms, Convolutional Neural Network (CNN), Recurrent Neural Network (RNN), Deep Neural Network (DNN), and/or algorithms associated with neural networks, to name a few. In some embodiments, the trained machine learning model 390 includes a computer program code stored in a memory 320 and/or executed by the control circuit 310 to process one or more images, as in step 502, shown in FIG. 5.

In an illustrative non-limiting example, each unit 402 in the image of FIG. 4A is represented by one of the units 402a through 402g in FIG. 4B. Although, the units 402 represent only a couple of brands, such as Coca Cola and Pepsi, there are various unit facing and products that make up the units 402. For example, units 402c, 402d, 402e, 402f, and 402g are associated with the Coca Cola brand. However, units 402c and 402d are associated with the diet Coca Cola. Moreover, unit 402c has a different facing and/or packaging as compared to unit 402d. As such, the control circuit 310 via a trained machine learning model 390 clusters each detected unit 402 into groups based on the units' textual similarities, visual similarities, geometrical similarities, and/or relative spatial distance to one another. For example, if two units are textually similar and/or visually similar but are further apart compared to other units, the control circuit 310 may place these two units in the same group or cluster. Conversely, if two units are in proximity with one another but textually and/or visually different, the control circuit 310 may place these two units in different groups or clusters. In yet another example, if two units are textually similar, visually similar, and/or in proximity with one another, the control circuit 310 may place these two units in the same group or clusters.

Figure 4C:
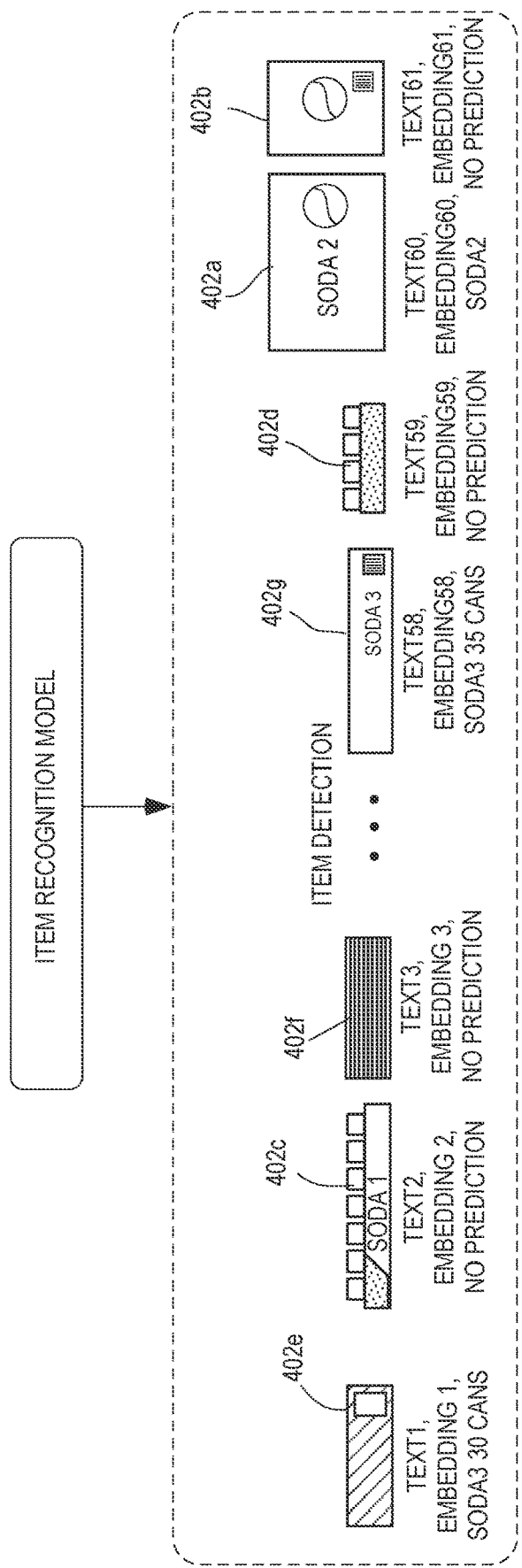

In some embodiments, the control circuit 310, at step 506, may group each detected unit 402 into one or more clusters using the following approach. We start by representing each detected unit 402 as a node 422 in a graph. Now we build the graph network by adding connections between the nodes 422 which is represented by an edge or a line with an assigned weight representing their similarity. This addition of an edge between two detected unit 402 is in accordance with one or more of the following rules: (1) distance based edges, (2) feature vector based edges, (3) OCR based edges, (4) Universal Product Code (UPC) based edges, and (5) weights are averaged if adding multiple edges to the same unit 402. In some embodiments, for distance based edges, an edge is added between two detected units 402 based on their closeness in the image. By one approach, Manhattan Distance technique is used as weight of the edge (normalized between 0 and 1). In some embodiments, for feature vector based edges, an edge is added between two detected units 402 based on their embedding similarity. The embedding distance is used as weight of the edge (normalized between 0 and 1). In some embodiments, for OCR based edges, an edge is added between two detected units 402 based on their textual similarity. The textual similarity may be used as weight of the edge (normalized between 0 and 1). In some embodiments, for UPC based edges, an edge is added between two detected units 402 if both detected units 402 are predicted as having the same UPC and/or a weight of 1 is assigned for these edges. In some embodiments, the control circuit 310 may remove edges if a pair of units 402 are predicted as belonging to or associated with different UPCs despite satisfying the rules described above. In some embodiments, each node 422 in FIG. 4F corresponds to a detected unit 402. The resulting graph with weighted edges of nodes 422 is showcased in FIG. 4F. The graph is now partitioned from the other weighted edge of another node 422 using Louvain Community Detection Algorithm. Louvain community detection algorithm is an open source method to extract clusters or communities from graph networks In some embodiments, the control circuit 310, at step 508, determines if one or more product identifiers, such as a barcode and a QR code, to name a few, are detected on units in each of the clustered group. Alternatively, or in addition to, the control circuit 310 may determine, using the trained machine learning model 390, whether a product identifier can be obtained based on text, visual image, and/or geometrical shape of one or more of the units 402 in each of the clustered group. In an illustrative non-limiting example, FIG. 4C illustrates the corresponding results of the control circuit 310 determining a product identifier for each of the units 402a through 402g in FIG. 4B.

Figure 4D:
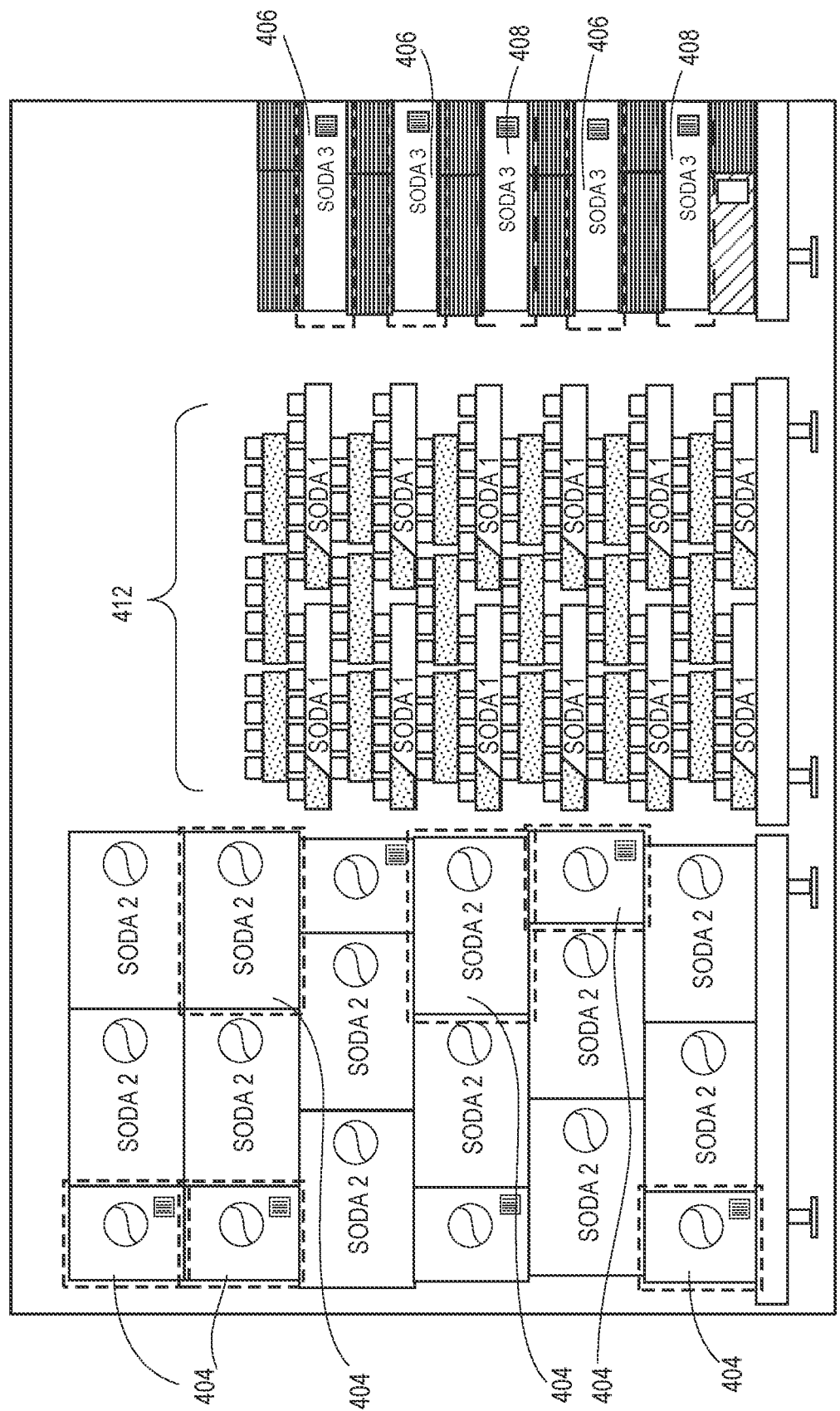

In another illustrative non-limiting example, FIG. 4D illustrates that the control circuit 310 determines a first product identifier 404, a second product identifier 406, and a third product identifier 408 in the image. In some embodiments, the control circuit 310 determines if one or more product identifiers are detected on units 402 in each of the clustered group. By one approach, if all the detected product identifiers are the same product identifier, the control circuit 310 may associate each unit 402 in the clustered group with the same product identifier. In an illustrative non-limiting example, cluster 410 of FIG. 4E shows that the cluster is associated with the first product identifier 404.

For example, the control circuit 310 may determine that one or more product identifiers have been detected in a first cluster (e.g., cluster 410 of FIG. 4E) of one or more clusters. The control circuit 310 may determine that the one or more product identifiers correspond to a first product identifier 404 or the same first product identifier 404. In response to the determination that the one or more product identifiers correspond to the first product identifier, the control circuit 310 may associate each of the detected units of the first cluster with a first product corresponding to the first product identifier 404. In some embodiments, the control circuit 310 may cause an update to an inventory of the first product in the electronic database 140 based on a count of the detected units of the first cluster.

By another approach, if more than one product identifiers are detected in the clustered group, the control circuit 310 may determine which one of the product identifiers is detected the most and then each unit 402 in the clustered group is associated with the most detected product identifier. In another illustrative non-limiting example, the control circuit 310 may detect the second product identifier 406 and the third product identifier 408 in cluster 414 in FIG. 4E. The control circuit 310 may determine which one of the second product identifier 406 or the third product identifier 408 is detected the most. As illustrated in FIG. 4D, the second product identifier 406 is detected the most. As such, the control circuit 310 may associate each unit 402 in cluster 414 with the second product identifier 406, as illustrated in FIGS. 4D and 4E. In some embodiments, the control circuit 310 may provide a message to an electronic device associated with a worker alerting that the association of the second product identifier 406 with all units 402 of cluster 414 be verified. In such embodiments, the worker may access the computing device 150 and input a confirmation that the association is correct. In some embodiments, by receiving the confirmation, the control circuit 310 and/or the trained machine learning model 390 may increase a corresponding confidence value in predicting the product associated with the second product identifier 406.

For example, the control circuit 310 may determine that a plurality of product identifiers have been detected in a first cluster (e.g., cluster 414 of FIGS. 4D and 4E) of the one or more clusters. In some embodiments, the control circuit 310 may determine that a second product identifier 406 of the plurality of product identifiers that have been detected the most relative to other product identifiers (e.g., the third product identifier 408) of the plurality of product identifiers. In response to the determination that the second product identifier of the plurality of product identifiers have been detected the most, the control circuit 310 may associate each of the detected units of the first cluster with a first product corresponding to the second product identifier 406. In some embodiments, the control circuit 310 may trigger an alert corresponding to a request to verify that the detected units of the first cluster is associated with the second product identifier 406. For example, the alert may be received and/or shown on a display device of an electronic device associated with a worker.

By another approach, if no product identifier is detected in the clustered group, the control circuit 310 may associate each unit 402 in the clustered group with a new product identifier. As illustrated in FIG. 4D, the control circuit 310 did not detect a product identifier in any of the units 402 in cluster 412. As such, as illustrated in FIG. 4E, the control circuit 310 associates a temporary product identifier 416 to each of the units 402 in cluster 412.

For example, the control circuit 310 may determine that no product identifiers have been detected in a first cluster (e.g., cluster 412 of FIGS. 4D and 4E) of the one or more clusters. In response to the determination that no product identifiers have been detected in the first cluster, the control circuit 310 may associate each of the detected units of the first cluster with a temporary product identifier 416. In response to a determination that the first cluster has been associated with the temporary product identifier, the control circuit 310 may trigger an alert requesting verification of a correct product identifier to associate with each of the detected units of the first cluster. For example, the alert may be received and/or shown on a display device of an electronic device associated with a worker.

In some embodiments, the control circuit 310 identifies the products in the image based on the number of clustered groups and/or the corresponding associated product identifiers. In some embodiments, the control circuit 310 makes a prediction when the control circuit 310 determines that all the units in a cluster is associated with a particular product identifier based on a detection, or lack thereof, of a handful of product identifiers of only some units in a cluster, as described above. As such, an automatic update to inventories of products in an electronic database may be performed by the control circuit 310 without having to positively identify each product in a product storage facility.

Figure 4F:
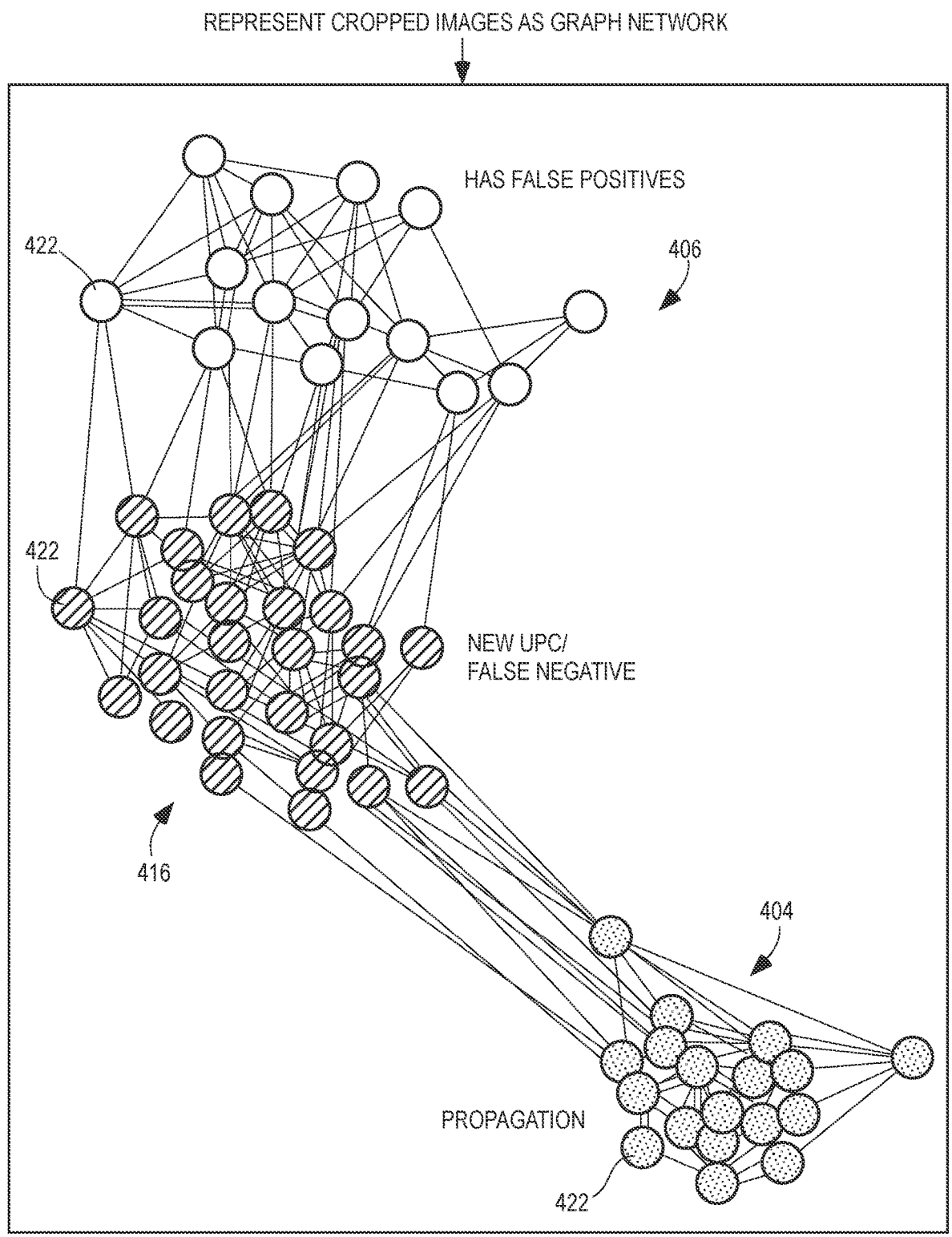

Following on the illustrated non-limiting examples described herein, the control circuit 310, at step 510, identifies a product corresponding to the detected or associated product identifier of each cluster 410, 412, 414. Alternatively, or in addition to, the control circuit 310 may generate a graph community detection as exemplified in FIG. 4F. FIG. 4F shows that the image shown in FIG. 4A depicts three products based on a determination by the control circuit 310 on the product corresponding to each of the three product identifiers 404, 406, 416.

Figure 4G:
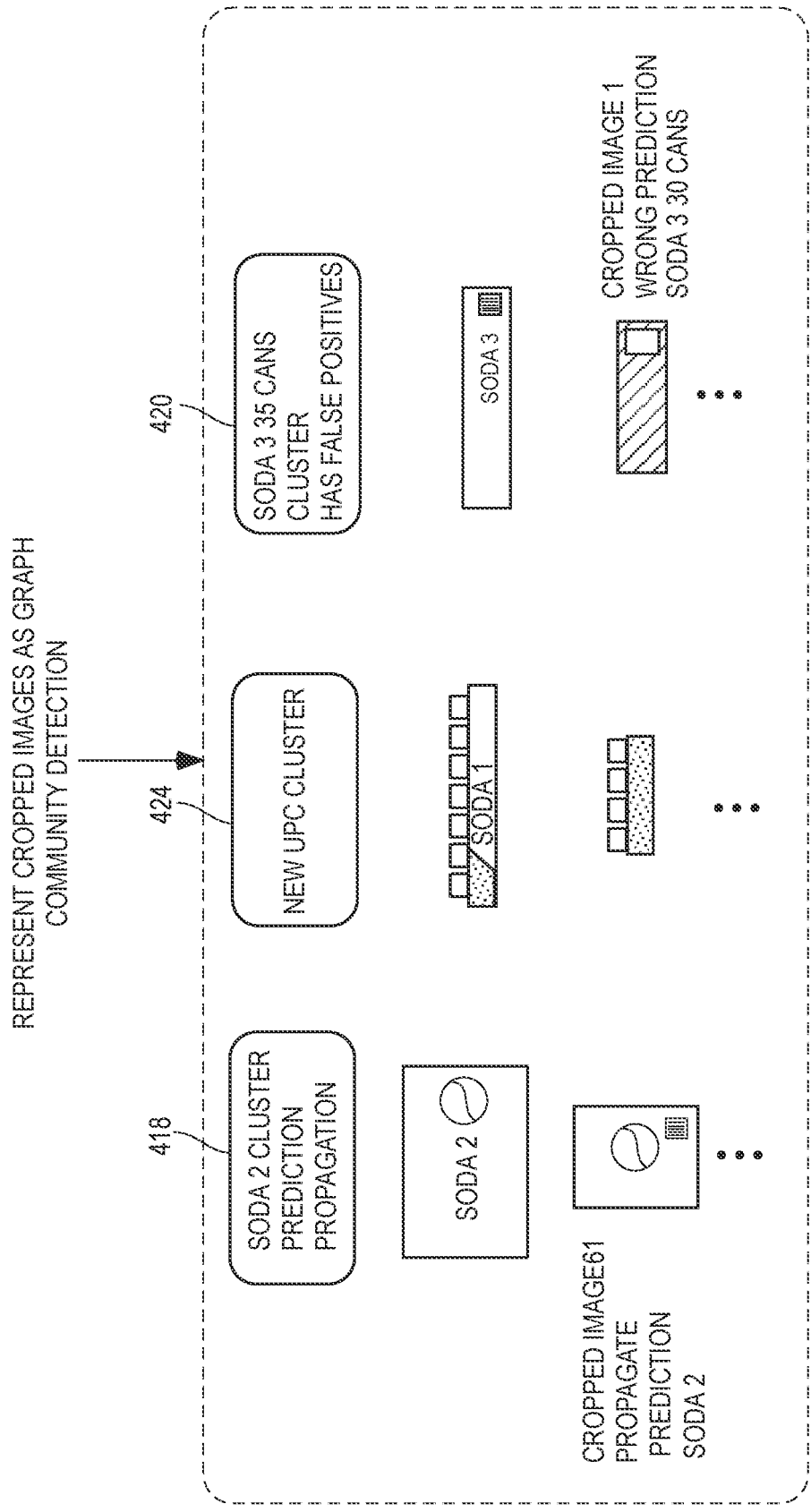
Figure 5:
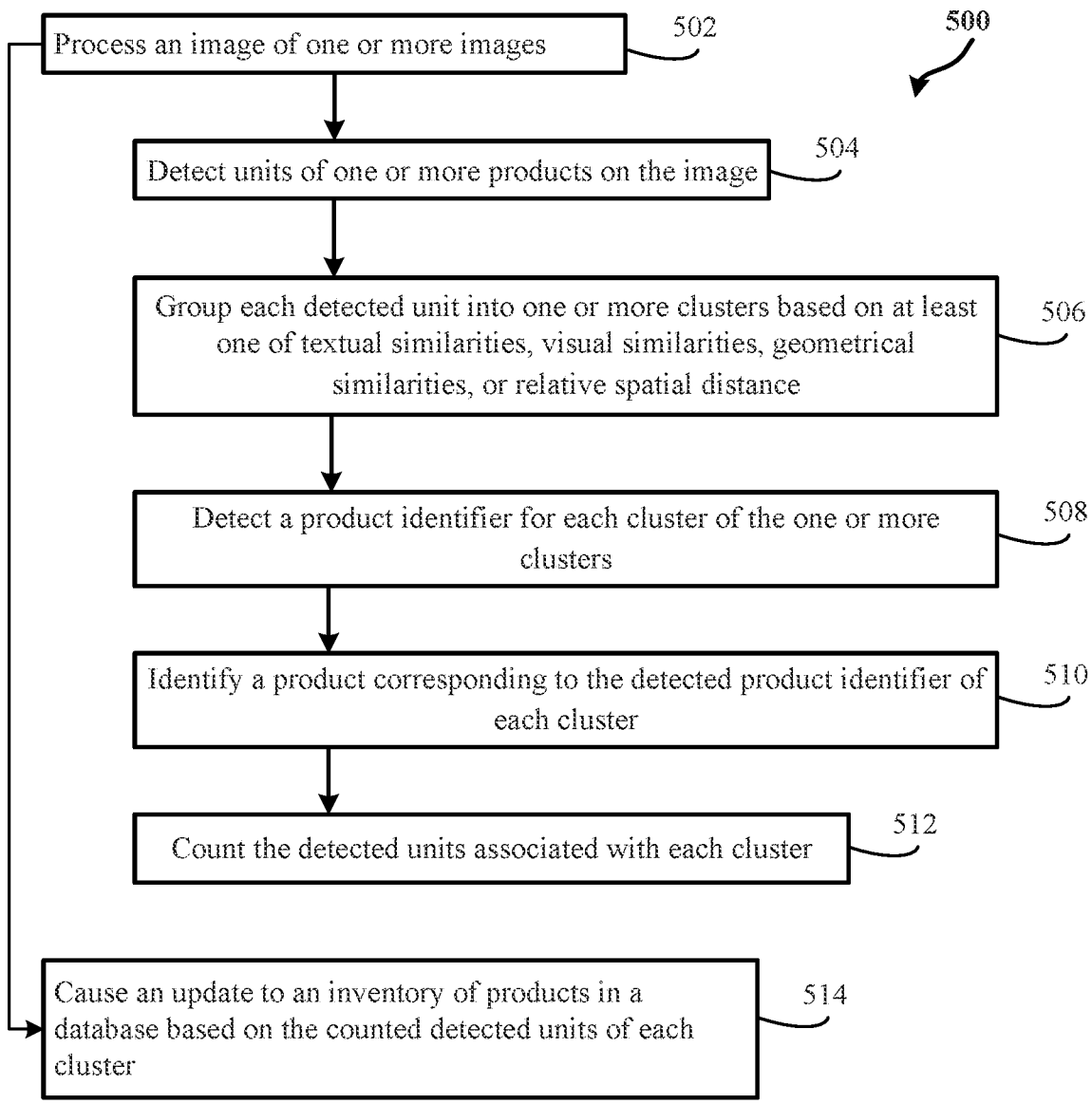
FIG. 5 shows a flow diagram of an exemplary processing of images in accordance with some embodiments.

In some embodiments, the control circuit 310, at step 512, counts the detected units associated with each cluster 410, 412, 414. Alternatively, or in addition to, the control circuit 310 counts each identified product in the image based on the number of detected units clustered in the group. Following on the illustrated non-limiting examples described herein, FIG. 4G depicts that three products identified in the image are Pepsi 418, 35 cans of a Coca Cola package 420, and a new product identifier 424. In some embodiments, the control circuit 310 outputs each identified product in the image and/or the corresponding count to a display device and/or an electronic device associated with a worker or an employee. Alternatively, or in addition to, the control circuit 310, at step 514, shown in FIG. 5, may cause an update to the inventory of products in the electronic database 140 based on the counted detected units of each cluster.

In some embodiments, the control circuit 310 outputs each detected product identifier and a corresponding count of the detected units of the product associated with the detected product identifier, and causes an additional control circuit to update the inventory of products based on the detected product identifier and the count.

In some embodiments, a worker may identify a correct product identifier to associate with the temporary product identifier 416. In such embodiments, the worker may access the computing device 150 and input the correct product identifier via the user interface 350 in order for the control circuit 310 to associate the units 402 associated with cluster 412 with the correct product identifier. As such, the control circuit 310 and/or the trained machine learning model 390 are trained to subsequently identify or recognize units 402 that were not previously identified or recognized as described herein.

A benefit to the present disclosure is an automatic update to the product inventory. Another benefit is automatic detection of a product that has not been added to the inventory, thereby easing the receipt of new products and inclusion to the electronic database 140, and the automatic retraining of the trained machine learning model 390.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; and entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system comprising:
    an electronic database configured to store data corresponding to an inventory of products in a product storage facility;
    an autonomous floor cleaner or sweeper configured to clean or maintain the product storage facility; and
    at least one image capture device configured to capture images of an area having one or more products at the product storage facility; and
    a control circuit coupled to the at least one image capture device, the at least one image capture device and the control circuit being incorporated into the autonomous floor cleaner or sweeper, wherein the control circuit is configured to perform the following operations:
    receive one of the images captured by the at least one image capture device;
    detecting units of a product in the received image;
    grouping the detected units of the product into a cluster of detected units based on at least one of textual similarities, visual similarities, geometrical similarities, or relative spatial distance;
    determining that multiple product identifiers are associated with the cluster of detected units;
    determining that a specific product identifier, within the multiple product identifiers, is associated with more detected units within the cluster of detected units than other product identifiers within the multiple product identifiers; and
    responsive to determining that the specific product identifier is associated with more of the detected units than the other product identifiers, generating an alert to request that an employee verify that the specific product identifier accurately identifies the cluster of detected units.

2. The system of claim 1, wherein the area comprises a rack, a pallet, and a shelving unit.

3. The system of claim 1, wherein the specific product identifier comprises a barcode and a QR code.

4. The system of claim 1, wherein the product storage facility comprises a product distribution center, a fulfillment center, and a retail store.

5. The system of claim 1, wherein a trained machine learning model is used to group the detected units of the product into the cluster of detected units.

6. The system of claim 1, wherein the control circuit is further configured to receive, from the employee, confirmation that the specific product identifier accurately identifies the cluster of detected units, and
    wherein the system further includes a trained machine learning model configured to increase, based on the confirmation, a confidence value in predicting that the product is associated with the specific product identifier, and wherein the trained machine learning model is trained to determine which product identifiers are associated with units detected in images captured by the image capture device.

7. A method comprising:
    maintaining an electronic database storing data corresponding to an inventory of products in a product storage facility;
    capturing, using at least one image capture device, images of an area having one or more products at the product storage facility;
    receiving, by a control circuit, one of the images from the at least one image capture device, the at least one image capture device and the control circuit being incorporated into an autonomous floor cleaner or sweeper configured to clean or maintain a product storage facility;
    detecting, by the control circuit, units of a product in the received image;
    grouping, by the control circuit, the detected units of the product into a cluster of detected units based on at least one of textual similarities, visual similarities, geometrical similarities, or relative spatial distance;
    determining that multiple product identifiers are associated with the cluster of detected units;
    determining that a specific product identifier, within the multiple product identifiers, is associated with more detected units within the cluster of detected units than other product identifiers within the multiple product identifiers; and
    responsive to determining that the specific product identifier is associated with more of the detected units than the other product identifiers, generating an alert to request that an employee verify that the specific product identifier accurately identifies the cluster of detected units.

8. The method of claim 7, wherein the area comprises a rack, a pallet, and a shelving unit.

9. The method of claim 7, wherein the specific product identifier comprises a barcode and a QR code.

10. The method of claim 7, wherein the product storage facility comprises a product distribution center, a fulfillment center, and a retail store.

11. The method of claim 7, wherein a trained machine learning model is used to group the detected units of the product into the cluster of detected units.

12. The method of claim 7, further comprising:
    receiving, from the employee, confirmation that the specific product identifier accurately identifies the cluster of detected units; and
    increasing, by a trained machine learning model based on the confirmation, a confidence value in predicting that the product is associated with the specific product identifier, wherein the trained machine learning model is trained to determine which product identifiers are associated with units detected in images captured by the image capture device.

13. A computer program product storing programming instructions that, upon execution by processor(s) of an inventory management system, cause the inventory management system to perform the following operations:
    maintaining an electronic database storing data corresponding to an inventory of products in a product storage facility;
    capturing, using at least one image capture device, images of an area having one or more products at the product storage facility;
    receiving, by a control circuit, one of the images from the at least one image capture device, the at least one image capture device and the control circuit being incorporated into an autonomous floor cleaner or sweeper configured to clean or maintain a product storage facility;
    detecting, by the control circuit, units of a product in the received image;
    grouping, by the control circuit, the detected units of the product into a cluster of detected units based on at least one of textual similarities, visual similarities, geometrical similarities, or relative spatial distance;
    determining that multiple product identifiers are associated with the cluster of detected units;

determining that a specific product identifier, within the multiple product identifiers, is associated with more detected units within the cluster of detected units than other product identifiers within the multiple product identifiers; and responsive to determining that the specific product identifier is associated with more of the detected units than the other product identifiers, generating an alert to request that an employee verify that the specific product identifier accurately identifies the cluster of detected units.

14. The computer program product of claim 13, wherein the area comprises a rack, a pallet, and a shelving unit.

15. The computer program product of claim 13, wherein the specific product identifier comprises a barcode and a QR code.

16. The computer program product of claim 13, wherein the product storage facility comprises a product distribution center, a fulfillment center, and a retail store.

17. The computer program product of claim 13, wherein a trained machine learning model is used to group the detected units of the product into the cluster of detected units.

18. The computer program product of claim 13, wherein the programming instructions, upon execution by the processor(s), further cause the inventory management system to perform the following operations:

receiving, from the employee, confirmation that the specific product identifier accurately identifies the cluster of detected units; and increasing, by a trained machine learning model based on the confirmation, a confidence value in predicting that the product is associated with the specific product identifier, wherein the trained machine learning model is trained to determine which product identifiers are associated with units detected in images captured by the image capture device.

\* \* \* \* \*